(12) United States Patent
Campo et al.

(10) Patent No.: US 7,873,552 B2
(45) Date of Patent: Jan. 18, 2011

(54) RECOMMENDING WASTE REDUCTIONS AND CREDIT PURCHASES FOR BUSINESS UNITS

(75) Inventors: Camilo Yamauchi Campo, Sao Paulo (BR); Lucas Goncalves Franco, Campinas (BR); Breno Henrique Leitão, Jd Guanabara Campinas (BR); Wainer dos Santos Moschetta, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 11/847,417

(22) Filed: Aug. 30, 2007

(65) Prior Publication Data

US 2009/0063231 A1 Mar. 5, 2009

(51) Int. Cl.
*G07B 17/00* (2006.01)
(52) U.S. Cl. ........................................ 705/30
(58) Field of Classification Search ............. 705/35–40, 705/30, 7, 1
See application file for complete search history.

(56) References Cited

U.S. PATENT DOCUMENTS

| 6,507,774 | B1 | 1/2003 | Reifman et al. | |
| 7,440,871 | B2 * | 10/2008 | McConnell et al. | 702/188 |
| 2006/0015424 | A1 | 1/2006 | Esposito, II et al. | |
| 2006/0085363 | A1 | 4/2006 | Cheng et al. | |

OTHER PUBLICATIONS

"Oil industry can develop creative solutions to address climate change." Middle East Company News [Dubai] Feb. 25, 2004,1(2 pages).*

Joseph Sarkis, Maurry Tamarkin. "Real Options Analysis for "Green Trading": The Case of Greenhouse Gases." The Engineering Economist 50.3 (2005): 273-294 (22 pages).*

James Emanuel . . . "Emission Trading in Europe." PPI May 1, 2004: 51-54 (4 pages).*

Baker, Erin. "Non-Linearities in the Cost of Reducing Emissions" Oct. 7, 2003, pp. 1-22 (22 pages).*

Yiridoe, Emmanuel K., and Alfons Weersink. "Marginal Abatement Costs of Reducing Groundwater-N Pollution with Intensive and Extensive Farm Management Choices" Agricultural and Resource Economics Review. Oct. 1998. pp. 169-185 (17 pages).*

Michael Obersteiner et al., "Avoiding a Lemons Market by Including Uncertainty in the Kyoto Protocol: Same Mechanism—Improved Rules", IIASA Science for Global Insight, Jul. 21, 2000, pp. 1-24, Austria.

Benjamin Marti, "Emissions of Power Delivery Systems", EEH—Power Systems Laboratory, Swiss Federal Institute of Technology, Jun. 30, 2005, pp. 1-118, Switzerland.

* cited by examiner

*Primary Examiner*—James P Trammell
*Assistant Examiner*—Elda Milef
(74) *Attorney, Agent, or Firm*—Owen J. Gamon (57) ABSTRACT

In an embodiment, revenue loss functions associated with business units are determined and waste credit constraints associated with the business units are received. A recommended waste credit purchase amount and recommended waste credit reduction amounts associated with the business units are calculated by minimizing a sum of the revenue loss functions and a purchase function, subject to the waste credit constraints, a purchase constraint, and a reduction goal constraint. In various embodiments, the recommended waste credit purchase amount and the recommended waste credit reduction amounts are presented, the amount of waste credits specified by the recommended waste credit purchase amount are purchased, and the business units reduce their waste emissions by their respective recommended waste credit reduction amounts. In an embodiment, the minimization is perfumed via a quadratic programming algorithm.

19 Claims, 4 Drawing Sheets

FIG. 1

USER INTERFACE 200

| BUSINESS UNIT ID | HISTORICAL DATA ID | REVENUE LOSS FUNCTION | WASTE CREDIT CONSTRAINT FOR BUSINESS UNIT | |
|---|---|---|---|---|
| BU1 | DATA A | N/A | X1 >=0 | 202-2 |
| BU2 | N/A | LOG(X2 + 1)/(10* X2) | X2 >=0 | 202-4 |
| BU3 | N/A | SQRT(X3 + 100) * (100/X3) | X3 >=0 | 202-6 |

TOTAL WASTE CREDIT REDUCTION GOAL CONSTRAINT: 20 WASTE CREDITS  220

WASTE CREDIT UNIT PRICE: $.11  222

WASTE CREDIT PURCHASE FUNCTION: (WASTE CREDIT UNIT PRICE) * X0  224

WASTE CREDIT PURCHASE CONSTRAINT: X0 >=0  226

WASTE CREDIT RECOMMENDATIONS 154

TO MINIMIZE REVENUE LOSSES CAUSED BY WASTE CREDIT REDUCTION:

BUSINESS UNIT BU1 SHOULD REDUCE X1= 0.0 WASTE CREDITS;  230

BUSINESS UNIT BU2 SHOULD REDUCE X2= .877 WASTE CREDITS;  232

BUSINESS UNIT BU3 SHOULD REDUCE X3= 10.122 WASTE CREDITS; AND  234

X0 = 9 WASTE CREDITS SHOULD BE PURCHASED.  236

FIG. 2

| BUSINESS UNIT HISTORICAL DATA A | | |
|---|---|---|
| HISTORICAL WASTE CREDITS SAVED (332) | HISTORICAL REVENUE LOSS (334) | |
| 2 | 3 | 302 |
| 1 | 1.2 | 304 |
| 2 | 1.0 | 306 |
| 3 | 2.0 | 308 |
| 4 | 2.5 | 310 |
| 5 | 2.1 | 312 |
| 6 | 2.4 | 314 |
| 7 | 2.7 | 316 |
| 8 | 2.2 | 318 |
| 9 | 2.8 | 320 |
| 12 | 3.5 | 322 |
| 14 | 4.0 | 324 |
| 15 | 3.4 | 326 |
| 16 | 3.8 | 328 |
| 17 | 4.2 | 330 |

RECOMMENDING WASTE REDUCTIONS AND CREDIT PURCHASES FOR BUSINESS UNITS

FIELD

An embodiment of the invention generally relates to determining recommended waste credit purchase amounts and recommended waste credit reductions for businesses.

BACKGROUND

An important problem in the modern world is the handling, treatment, and prevention of greenhouse gas emissions, such as carbon dioxide, which occur as the byproduct of many manufacturing processes. One technique that attempts to reduce greenhouse gas emissions is known as the Kyoto Protocol, under which participating countries set quotas or limits on the amount of greenhouse gases that those countries can emit into the environment. The governments of the countries, in turn, set quotas on the emissions of businesses that operate with their countries, e.g., in the form of carbon credits.

One carbon credit gives its owner the right to emit one unit (e.g., one tonne or metric ton) of carbon dioxide. Businesses that emit carbon dioxide in an amount that exceeds their allotted carbon credits must buy additional carbon credits for their excess emissions, while businesses that are below their quotas can sell their remaining credits. By allowing carbon credits to be bought and sold on an open market, a business for which reducing its emissions would be expensive or prohibitive can pay another business to make the reduction. This reduces the quota's impact on the business, while still allowing a country to keep its emissions under its quota. Thus, carbon credits are a tradable permit scheme that assigns carbon dioxide gas emissions a monetary value.

Businesses naturally prefer to minimize their total costs related to emissions, but determining how to do so is a difficult problem because both buying carbon credits and taking steps to reduce emissions have associated costs, and these costs can vary. For example, a business may have many organizational units, such as departments, that emit carbon dioxide as a part of their regular processes, either directly or indirectly, and the emission rates may vary between departments. As an example, an accounting department may have a low emission rate of carbon dioxide while a department that generates electricity may have a much higher emission rate. Also, the revenue lost or the increased costs that result from actions taken to decrease emissions may vary between departments.

Thus, a technique is needed for planning emissions reductions and carbon credits trading, in order to reduce the revenue loss or cost. Although the aforementioned problems have been described in the context of carbon credits and carbon dioxide, they could also apply to other waste byproducts, such as waste paper, scrap metals, methane, nitrous oxide, hydro fluorocarbons (HFCs), or any other waste items. Further, although the aforementioned problems have been described in the context of the Kyoto Protocol, they apply equally to any initiative that uses waste credits, such as the European Union Emissions Trading Scheme, and the United Nations Clean Development Mechanism.

SUMMARY

A method, apparatus, system, and storage medium are provided. In an embodiment, revenue loss functions associated with business units are determined and waste credit constraints associated with the business units are received. A recommended waste credit purchase amount and recommended waste credit reduction amounts associated with the business units are calculated by minimizing a sum of the revenue loss functions and a purchase function, subject to the waste credit constraints, a purchase constraint, and a reduction goal constraint. In various embodiments, the recommended waste credit purchase amount and the recommended waste credit reduction amounts are presented, the amount of waste credits specified by the recommended waste credit purchase amount are purchased, and the business units reduce their waste emissions by their respective recommended waste credit reduction amounts. In an embodiment, the minimization is performed via a quadratic programming algorithm on the sum of the revenue loss functions and the purchase function, subject to the waste credit constraints, the purchase constraint, and the reduction goal constraint. In this way, in an embodiment, waste emissions by business units are reduced in a way that reduces revenue loss.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

Figure 1:
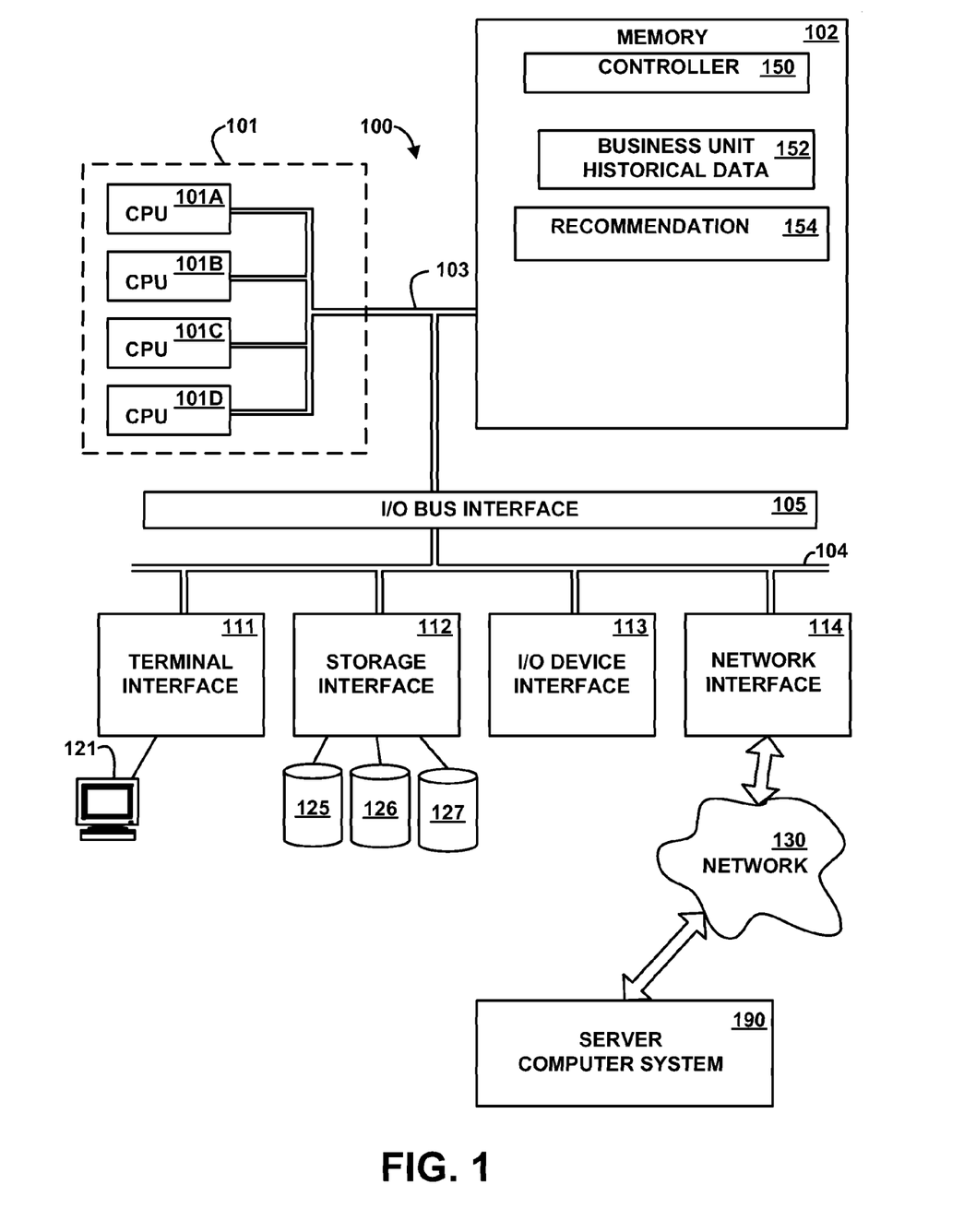
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected to a server computer system 190 via a network 130, according to an embodiment of the present invention. The terms "client" and "server" are used herein for convenience only, and in various embodiments a computer system that operates as a client in one environment may operate as a server in another environment, and vice versa. In an embodiment, the hardware components of the computer system 100 may be implemented by a IBM System i5 computer system, respectively, available from International Business Machines Corporation of Armonk, N.Y. But, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130, such as the server computer system 190. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a controller 150, business unit historical data 152, and a recommendation 154. Although the controller 150, the business unit historical data 152, and the recommendation 154 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 150, the business unit historical data 152, and the recommendation 154 are illustrated as being contained within the main memory 102, these elements are not necessarily all completely contained in the same storage device at the same time. Further, although the controller 150, the business unit historical data 152, and the recommendation 154 are illustrated as being separate entities, in other embodiments some of them, portions of some of them, or all of them may be packaged together.

In various embodiments, the controller 150 may be implemented via an operating system, a user application, a third-party application, or any combination thereof. In various embodiments, the controller 150 includes instructions capable of executing on the processor 101 or statements capable of being interpreted by instructions that execute on the processor 101 to perform the functions as further described below with reference to FIG. 4. In another embodiment, the controller 150 may be implemented in hardware via logic cards, circuit cards, logic gates, and/or other hardware elements. Since, as explained above, the controller 150 may include a combination of components, one component may perform one action while another component performs another action.

The business unit historical data 152 represents waste credits that have been saved in the past and their associated losses of revenue or increases in expenses that were caused by or were the result of the actions taken to save the waste credits. In an embodiment, the controller 150 uses the business unit historical data 152 to calculate, determine, or create revenue loss functions for business units. A data structure for example business unit historical data is further described below with reference to FIG. 3.

A waste credit is a permit that gives its owner the right to emit a unit (e.g., one tonne or metric ton) of waste into the environment. In an embodiment, a waste credit is implemented as a carbon credit, but in other embodiments any type of waste and any type of permit scheme may be used. Other examples of waste include waste paper, scrap metals, methane, nitrous oxide, hydro fluorocarbons (HFCs), or any other type of waste items. Emission of a waste occurs when a business unit releases waste into the environment, e.g., by burning fuel that releases carbon dioxide or sending waste paper to a landfill. Emission of waste can be offset by consuming waste, i.e., accepting waste from the environment, e.g., by recycling waste paper into lumber products, by recycling scrap aluminum into cans, or by planting trees, which as a part of photosynthesis accept carbon dioxide and emit oxygen, thus reducing the amount of waste in the environment. Reducing the amount of waste emitted reduces the amount of waste credits that a business unit needs. Waste credits may be initially allotted from a government and bought from or sold to other businesses on an open market.

A business unit is a sub-division or part of a business that receives an allotment of waste credits. In various embodiments, a business may be a for-profit entity, a non-profit entity, or a government entity. In addition, a business may be incorporated or unincorporated. In various embodiments, a business unit may be an employee, a department, a division, a subsidiary, a corporation, a partnership, an agency, a governmental agency, a troop, a brigade, a group, an office, a branch, or any other organizational unit to which people and/or materials belong and are managed. Business units are often organized by function, with different business units performing different functions, producing different products, or having different areas of responsibility. Business units often have a hierarchical organization, in which the business units may be divided and subdivided into larger or smaller units.

The recommendations 154 include a recommended distribution of waste credit purchase amounts and waste credit reduction amounts among the business units that belong to, or are associated with a business. The recommendations 154 may be stored in a storage device, such as the memory 102, sent to a programmatic entity, displayed on a video display terminal, presented via audio speakers, or transmitted across the network 130, e.g., to the server computer system 190. In response to receiving the recommendations 154, the business or business unit may reduce its waste emissions by the amount recommended by the waste credit reduction amounts or purchase waste credits in the amount recommended by the waste credit purchase amounts. An example of the recommendations 154 is further described below with reference to FIG. 2.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interface) bus, or any other appropriate bus technology.

The I/O interface units support communication with a variety of storage and I/O devices. For example, the terminal interface unit 111 supports the attachment of one or more user terminals 121, which may include user output devices (such as a video display device, speaker, and/or a Braille output device) and user input devices (such as a keyboard, mouse, touchpad, keypad, trackball, microphone, light pen, or other pointing device). The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types, such as printers or fax machines. The network interface 114 provides one or more communications paths from the computer system 100 to other digital devices and computer systems 190; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100 and the server computer systems 190. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The server computer system 190 may include some or all of the hardware components previously described above as being included in the client computer system 100.

It should be understood that FIG. 1 is intended to depict the representative major components of the client computer system 100, the network 130, and the server computer system 190 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., and are referred to hereinafter as "computer programs," or simply "programs." The computer programs typically comprise one or more instructions that are resident at various times in various memory and storage devices in the client computer system 100, and that, when read and executed by one or more processors in the client computer system 100, cause the client computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the client computer system 100 via a variety of tangible signal-bearing media that may be operatively or communicatively connected (directly or indirectly) to the processor or processors, such as the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), the main memory 102, CD-RW, or diskette; or (3) information conveyed to the client computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
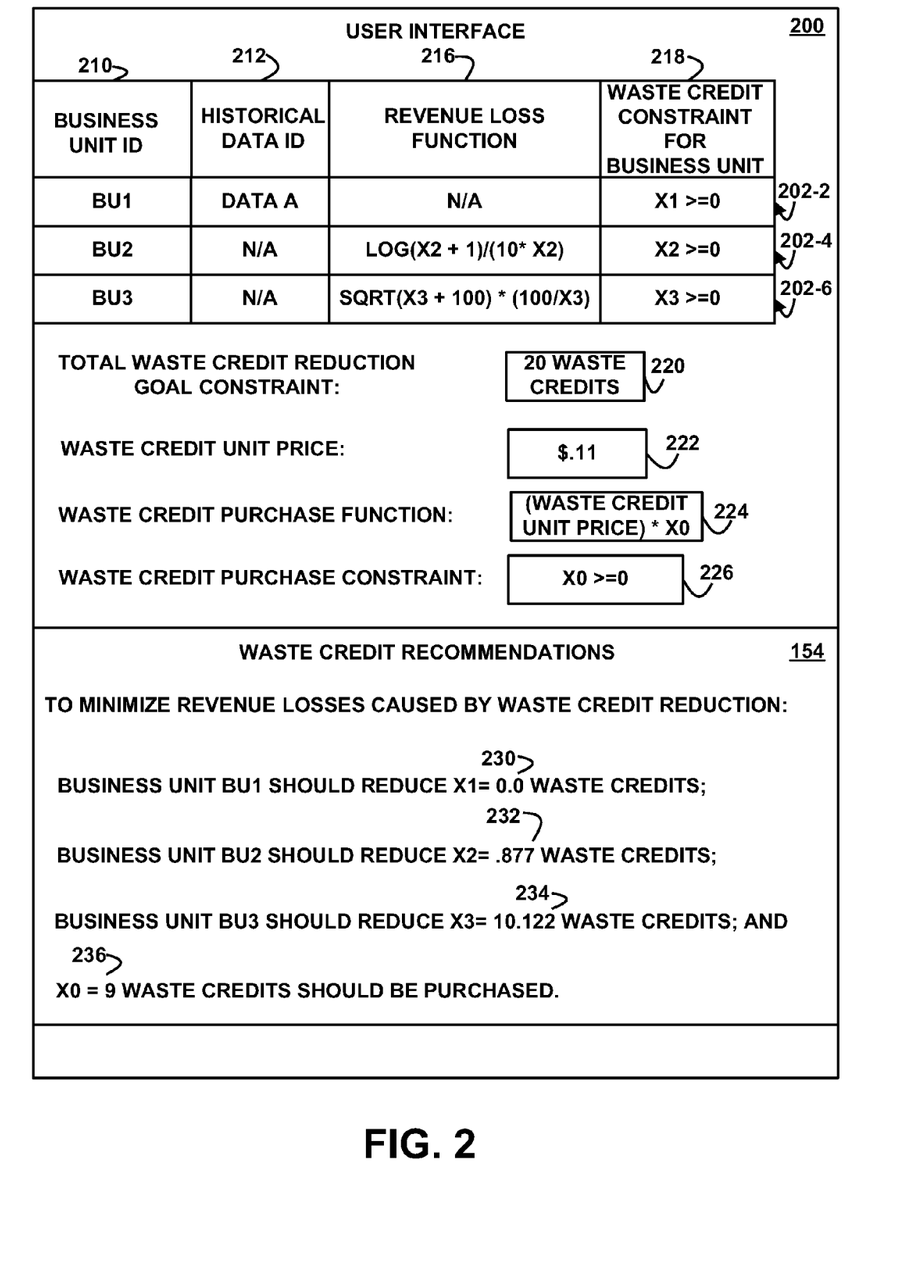
FIG. 2 depicts a block diagram of an example user interface, according to an embodiment of the invention.

FIG. 2 depicts a block diagram of an example user interface 200, according to an embodiment of the invention. The controller 150 displays or presents the example user interface 200 via the user terminal 121. The example user interface 200 includes example data records 202-2, 202-4, and 202-6, each of which includes a business unit identifier field 210, a historical data identifier field 212, a revenue loss function field 216, and a waste credit constraint field 218.

A user enters data into the fields of the records 202-2, 202-4, and 202-6 via the terminal 121 and sends the data records to the controller 150, which receives the data records. In another embodiment, the controller 150 reads the data contents of the records from a database, file, page, array, or other data repository.

The business unit identifier field 210 specifies the business unit associated with the respective record. The historical data identifier field 212 is optional and, if present, specifies the name, location, address, or other identifier of historical data associated with the business unit identified by the business unit identifier field 210, in the same record. The revenue loss function field 216 is optional and, if present, specifies a function, formula, or method for calculating the loss of revenue or increased cost that results from the act of reducing waste emissions by the business unit identified by the business unit identifier field 210, in the same record. Reducing waste emissions requires action and money, e.g., planting trees may require buying land and seeds and paying personnel to plant and tend the trees, which causes increased cost or reduced revenue for the business unit. The use of the variables $x_2$ and $x_3$ represents the recommended waste credit reduction amounts for the respective business units. They are represented as variables in the records because, at the time the user enters the revenue loss function 216, the values of the recommended waste credit reduction amounts are unknown. Thus, the revenue loss function 216 is used to calculate the amount of revenue that the business unit loses if the business unit reduces its waste emissions by a given recommended waste credit reduction amount.

The waste credit constraint field 218 field specifies constraints or conditions that the values of the recommended waste credit reduction amounts ($x_1$, $x_2$, and $x_3$, corresponding to the respective business units BU1, BU2, and BU3) that the controller 150 produces (illustrated as the recommended waste credit reduction amounts 230, 232, and 234 in the recommendations 154) must meet. In the example data of FIG. 2, the waste credit constraints 218 require that the recommended waste credit reduction amounts ($x_1$, $x_2$, and $x_3$) all be greater than zero, but in other embodiments, any constraint may be used. For example, a user may desire to require that a particular business unit reduce more waste credits (reduce more corresponding waste emissions) than some other business unit, by setting the waste credit constraints 218 to different amounts for different business units.

The user interface 200 further includes a total waste credit reduction goal constraint 220, a waste credit unit price 222, a waste credit purchase function 224, and a waste credit purchase constraint 226, all of which include data that the user specifies and inputs to the controller 150 via the user interface 200. The total waste credit reduction goal constraint 220 specifies the number of waste credits that the user or business desires to reduce. By operation of the user interface 200, the user requests the controller 150 to distribute the amount specified by the total waste credit reduction goal constraint 220 among a recommended waste credit purchase amount and among the business units, in the form of recommended waste credit reduction amounts, which the controller 150 calculates and presents, in the recommendations 154.

The waste credit unit price field 222 specifies the price at which a waste credit is available to be purchased, i.e., the price rate of waste credits. In the example illustrated, one waste credit may be purchased on the open market for $0.11. The waste credit purchase function 224 specifies a function, formula, or equation for calculating the price for a recommended waste credit purchase amount ($x_0$). In the example illustrated in FIG. 2, the waste credit purchase function 224 is the waste credit unit price (element 222) multiplied by the recommended waste credit purchase amount ($x_0$).

The waste credit purchase constraint field 226 specifies a constraint that the recommended value that the controller 150 produces for the waste credit purchase amount ($x_0$) must meet. In the example illustrated in FIG. 2, the waste credit purchase constraint 226 specifies that the value that the controller 150 produces for the recommended waste credit purchase amount ($x_0$) must be greater than or equal to zero, but in other embodiments, any constraint may be used. For example, a user may desire to require that some number of waste credits be recommended for purchase.

The user interface 200 further includes the recommendation 154. The recommendation 154 includes the recommended waste credit reduction amounts 230, 232, and 234, corresponding to the respective business units represented by the records 202-2, 202-4, and 202-6. The recommended waste credit reduction amounts 230, 232, and 234 are the amounts of waste credits that the controller 150 recommends that the respective business units should reduce, i.e., the business units are recommended to reduce their waste emissions by the amount, which consequently reduces their need for a credit or permit for that amount.

Notice that the values for the recommended waste credit reduction amounts 230, 232, and 234 meet the constraints specified by the waste credit constraint field 218 in the respective records 202-2, 202-4, and 202-6. For example, the value of $x_1$ is 0 (element 230), which is greater than or equal to 0, as specified in the field 218 in the record 202-2; the value of $x_2$ is 0.877 (element 232), which is greater than or equal to 0, as specified in the field 218 in the record 202-4; and the value of $X_3$ is 10.122 (element 234), which is greater than or equal to 0, as specified in the field 218 in the record 202-6.

The recommendation 154 further includes a recommended waste credit purchase amount 236, which specifies the amount of waste credits that the controller 150 recommends that the business should purchase. Notice that the value of $x_0$ is 9 (element 236), which is greater than or equal to 0, as specified in the waste credit purchase constraint 226; thus, the recommended waste credit purchase amount meets the waste credit purchase constraint 226, or causes the constraint to be satisfied. Notice that the sum of the values of $x_0$, $x_1$, $x_2$, and $x_3$=20 (when rounded), which is identical the total waste credit reduction goal constraint 220; thus, the values produced by the controller 150 for the recommended waste credit reduction amounts 230, 232, and 234 and the recommended waste credit purchase amount 236 meet the total waste credit reduction goal constraint 220.

Figure 3:
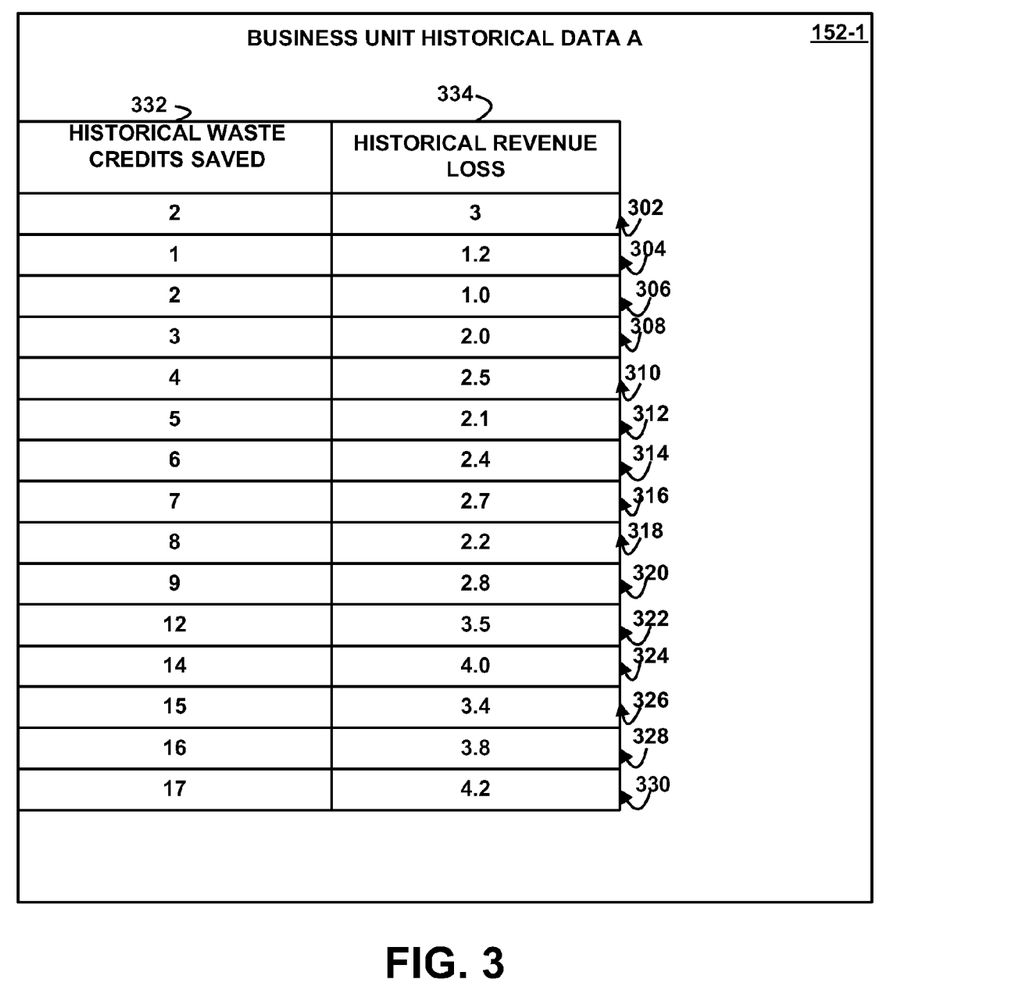
FIG. 3 depicts a block diagram of an example data structure for business unit historical data, according to an embodiment of the invention.

FIG. 3 depicts a block diagram of an example data structure for business unit historical data 152-1, according to an embodiment of the invention. The business unit historical data 152-1 represents historical waste credits 332 that were previously saved and their associated losses of business revenue or increases in business expenses 334, which were caused by, or were the result of, the actions the business unit took to save the corresponding historical waste credits 332. In an embodiment, the controller 150 uses the business unit historical data 152-1 to calculate, determine, or create revenue loss functions for its associated business unit.

The business unit historical data 152-1 is an example of the business unit historical data 152 (FIG. 1), and the business unit historical data 152 (FIG. 1) generically refers to the business unit historical data 152-1. The business unit historical data 152-1 is identified by the historical data identifier of "Data A," as illustrated by the historical data identifier field 212 (FIG. 2) in the record 202-2, associated with the business unit identifier 210 of "BU1." Thus, the business unit historical data 152-1 represents the historical waste credits saved 322 and the corresponding historical revenue loss 334, which resulted, for the business unit "BU1." Other business units may have their own historical data.

The business unit historical data 152-1 includes example records 302, 304, 306, 308, 310, 312, 314, 316, 318, 320, 322, 324, 326, 328, and 330, each of which includes the historical waste credits saved field 332 and a corresponding historical revenue loss field 334. Example record 302 indicates that, at some time in the past, the business unit "BU1" saved "2" historical waste credits 332, and the act of saving those waste credits caused a revenue loss or increased expenses 334 of "3."

Figure 4:
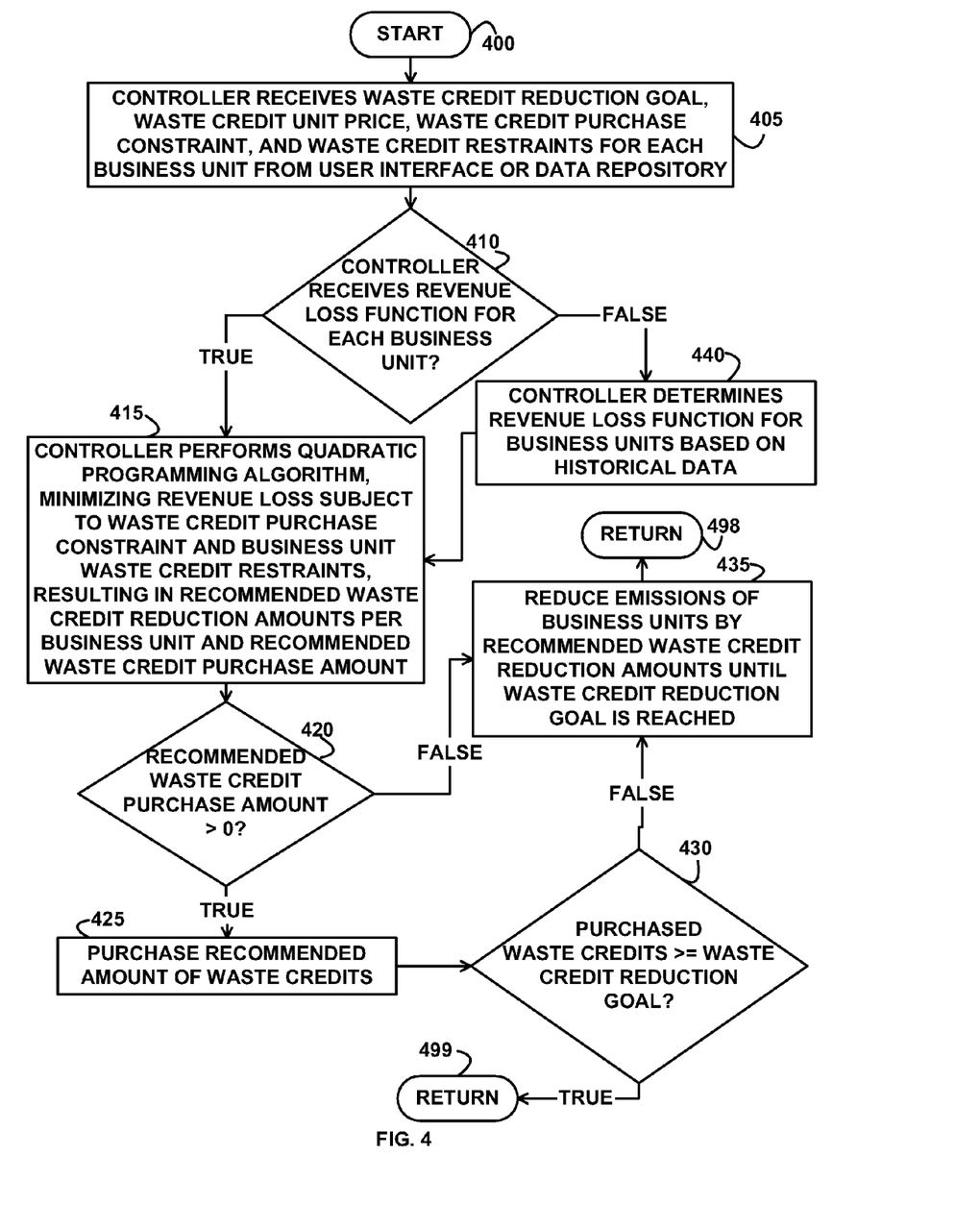
FIG. 4 depicts a flowchart of example processing for minimizing emission costs, according to an embodiment of the invention.

FIG. 4 depicts a flowchart of example processing for minimizing emission costs, according to an embodiment of the invention. Control begins at block 400. Control then continues to block 405 where the controller 150 receives the total waste credit reduction goal constraint 220, receives the waste credit unit price 222, and receives the waste credit purchase constraint 226. The controller 150 further receives the waste credit restraints 218 for each business unit. In an embodiment, the controller 150 receives the data from the user interface 200, but in another embodiment, the controller 150 receives the data from a database, a file, from a page, from a message, from a packet received via the network 130, from another program, or via any other appropriate technique. The controller 150 further receives the business identifiers 210 for the business units, optionally receives the historical data identifiers 212 for some or all of the business units, and optionally receives the revenue loss functions 216 for some or all of the business units.

Control then continues to block 410 where the controller 150 determines whether the revenue loss functions 216 were received for all business units. If the determination at block 410 is true, then the revenue loss functions 216 were received for all business units, so control to block 415 where the controller 150 finds a combination of the recommended waste credit reduction amounts (e.g., 230, 232, and 234) and the recommended waste credit purchase amount (e.g., 236) that cause the sum of the revenue loss functions 216 and the waste credit purchase function 224 to achieve a minimum (as compared to other combinations that also meet the constraints), where the recommended waste credit reduction amounts meet the respective waste credit constraints 218, the recommended waste credit purchase amount 236 meets the waste credit purchase constraint 226, and the sum of the recommended waste credit reduction amounts (230, 232, and 234) and the recommended waste credit purchase amount 236 meets or equals the total waste credit reduction goal constraint 220.

As an aid to understanding the processing of block 415, consider the following equations:

$$R = f_1(x_1) + f_2(x_2) + \ldots + f_n(x_n) + g_0(x_0)$$

subject to the constraints of:

$$T = x_1 + x_2 + \ldots + x_n x_0$$

for all i, $x_i >= 0$ $$g_0(x_0) = p * x_0,$$

where:

n is the number of business units;

R is the revenue loss or cost to the business of reducing and purchasing waste credits;

for all $i >= 1$, $x_i$ is the recommended waste credit reduction amount (e.g., 230, 232, or 234 in FIG. 2) for business unit i;

$f_i(x_i)$ is the revenue loss function 216 for business unit i;

$x_0$ is recommended waste credit purchase amount 236.

$g_0(x_0)$ is the price of the recommended waste credit purchase amount if the recommended waste credits are purchased; and p is the waste credit unit price 222.

Thus, the processing of block 415 finds the values of $x_1$, $x_2$, ..., $x_n$ and $x_0$ that minimize the value of R and also meet the constraints.

Using the example data illustrated in FIG. 2, the equations become:

$$R = (x_1/\mathrm{sqrt}(x_1)) + \log(x_2+1)/(10*x_2) + \mathrm{sqrt}(x_3+100)*100/x_3 + x_0 * 3,$$

where sqrt is the square root function,
subject to the constraints of:

$$20 = x_1 + x_2 + x_3 + x_0,$$

$$x_1 >= 0$$

$$x_2 >= 0,$$

$$x_3 >= 0, \text{ and}$$

$$x_0 >= 0.$$

In an embodiment, the controller 150 performs the processing of block 415 via a quadratic programming algorithm. Quadratic programming algorithms optimize quadratic equations that are subject to inequality or equality constraints. In various embodiments, a variety of quadratic programming algorithms may be used, such as an interior point algorithm, an active set algorithm, and a conjugate gradient algorithm.

In the active set algorithm, the set of constraints define a feasible region. A problem is defined using an objective function to minimize or maximize, and a set of constraints that define the feasible region, that is, the set of all x to search for the optimal solution. Given a point, x, in the feasible region, a constraint is called active if the result of the objective function is 0; and inactive if the result of the objective function is greater than 0. The active set at x is then made up of those constraints that are active at the current point.

The active set algorithm is then described by the following pseudo-code:

Find a feasible starting point;
   repeat until an optimal solution is found;
   solve the equality problem defined by the active set;
   compute the lagrangians (LaGrange multiplier) of the active set;
   remove a subset of the constraints with negative lagrangians (negative LaGrange multiplier);
   search for infeasible constraints;
end repeat The controller 150 displays or presents the calculated recommendations 154 via the user interface 200 of the user terminal 121, as previously described above with reference to FIG. 2.

Control then continues to block 420 where the controller 150 determines whether the recommended waste credit purchase amount 236 that the processing of block 415 calculated is greater than zero. If the determination at block 420 is true, then recommended waste credit purchase amount 236 is greater than zero, so control continues to block 425 where the user or business purchases the waste credits in the amount specified by the recommended waste credit purchase amount 236 where the purchased weight credits have the waste credit unit price 222.

Control then continues to block 430 where the controller 150 determines whether the waste credits that were recommended and purchased are sufficient to meet the total waste credit reduction goal constraint 220, i.e., the controller 150 determines whether the recommended waste credit purchase amount 236 (that were purchased) is greater than or equal to the total waste credit reduction goal constraint 220. If the determination at block 430 is true, then the recommended waste credit purchase amount 236 (that were purchased) is greater than or equal to the total waste credit reduction goal constraint 220, so the goal has been met, so control continues to block 499 without the business units reducing waste emissions.

If the determination at block 430 is false, then the recommended waste credit purchase amount 236 (that were purchased) is less than the total waste credit reduction goal constraint 220, so control continues to block 435 where the business units reduce their waste emissions by their respective recommended waste credit reduction amounts until the waste credit reduction goal is reached. In an embodiment, each business unit, in turn, reduces its emission of waste into the environment, after which a determination is made whether the emission reduction amounts plus the waste credits purchased is greater than or equal to the waste credit reduction goal 220. So long as the goal is not reached, the business units continue reducing their emissions by their respective recommended waste credit reduction amounts. Once the sum of the waste credits that were purchased and the emissions that were reduced meets or exceeds the waste credit reduction goal, control continues to block 498 where the logic of FIG. 4 returns.

If the determination at block 420 is false, then the recommended waste credit purchase amount 236 that the processing of block 415 calculated is not greater than zero, and the controller 150 has recommended that no waste credits be purchased, so control continues to block 435, where the business units reduce their waste emissions by their respective recommended waste credit reduction amounts, until the sum of the reduced emissions is greater than or equal to the total waste credit reduction goal constraint 220, as previously described above. Control then continues to block 498 where the logic of FIG. 4 returns.

If the determination at block 410 is false, then a revenue loss function was not received for all business units, so control to block 440 where the controller 150 reads the business unit historical data 152 identified by the received historical data identifier 212 for those business units for which a revenue loss function was not received and creates the revenue loss function from the historical data 152. In various embodiments, the controller 150 creates the revenue loss function by an ordinary least squares algorithm or a b-spline (basis spline) algorithm, in order to create a function that describes a line or curve that fits the historical waste credits saved 332 and their corresponding historical revenue losses 334.

An ordinary least squares algorithm finds the best-fitting curve to a given set of points (the historical waste credits saved 332 and the historical revenue loss 334) by minimizing the sum of the squares of the offsets ("the residuals") of the points from the curve.

A spline is a function defined piecewise by polynomials. A B-spline is a spline function that has minimal support with respect to a given degree, smoothness, and domain partition.

Using the ordinary least squares algorithm and the example business unit historical data 152-1 of FIG. 3, the controller 150 determines that the revenue loss function for the business unit "BU1" is:

$f_1(x_1)=x_1/\sqrt{x_1}$, as was previously used above with reference to block 415.

Control then continues to block 415, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
determining using a computer, a plurality of revenue loss functions associated with a plurality of respective business units, wherein the plurality of revenue loss functions calculate an amount of revenue that each of the plurality of respective business units loses from reducing emissions by the plurality of business units and wherein the plurality of revenue loss functions are functions of a plurality of recommended waste credit reduction amounts, wherein the plurality of recommended waste credit reduction amounts are unknown at a time of the determining the plurality of revenue loss functions, and wherein the plurality of revenue loss functions are different for each of the plurality of respective business units, wherein the determining the plurality of revenue loss functions further comprises reading a plurality of historical data associated with the plurality of business units, wherein each of the plurality of historical data comprises historical waste credits saved and associated historical revenue losses that were caused by actions taken to save the historical waste credits and creating the plurality of revenue loss functions that describe a plurality of curves that fit the historical waste credits saved and the historical revenue losses;
receiving a plurality of waste credit constraints associated with the plurality of respective business units;
calculating a recommended waste credit purchase amount and the plurality of recommended waste credit reduction amounts associated with the plurality of respective business units, wherein the calculating further comprises minimizing a sum of the plurality of the revenue loss functions and a purchase function, subject to the waste credit constraints, a purchase constraint, and a reduction goal constraint and storing the recommended waste credit purchase amount in computer memory; and
presenting the recommended waste credit purchase amount and the plurality of recommended waste credit reduction amounts via an output device.

2. The method of claim 1, further comprising:
receiving the reduction goal constraint and the purchase constraint from a user interface.

3. The method of claim 1, wherein the determining the plurality of revenue loss functions further comprises:
creating the plurality of revenue loss functions by a least squares algorithm.

4. The method of claim 1, wherein the determining the plurality of revenue loss functions further comprises:
creating the plurality of revenue loss functions by a basis spline algorithm.

5. The method of claim 1, wherein the minimizing further comprises:
performing a quadratic programming algorithm on the sum of the plurality of the revenue loss functions and the purchase function, subject to the waste credit constraints, the purchase constraint, and the reduction goal constraint.

6. The method of claim 1, further comprising:
purchasing an amount of waste credits specified by the recommended waste credit purchase amount.

7. The method of claim 1, further comprising:
reducing waste emissions from the plurality of business units by the plurality of respective recommended waste credit reduction amounts.

8. A storage medium encoded with instructions, wherein the instructions when executed comprise:
determining a plurality of revenue loss functions associated with a plurality of respective business units, wherein the plurality of revenue loss functions calculate an amount of revenue that each of the plurality of respective business units loses from reducing emissions by the plurality of business units and wherein the plurality of revenue loss functions are functions of a plurality of recommended waste credit reduction amounts, wherein the plurality of recommended waste credit reduction amounts are unknown at a time of the determining the plurality of revenue loss functions, and wherein the plurality of revenue loss functions are different for each of the plurality of respective business units, wherein the determining the plurality of revenue loss functions further comprises reading a plurality of historical data associated with the plurality of business units, wherein each of the plurality of historical data comprises historical waste credits saved and associated historical revenue losses that were caused by actions taken to save the historical waste credits and creating the plurality of revenue loss functions that describe a plurality of curves that fit the historical waste credits saved and the historical revenue losses;
receiving a plurality of waste credit constraints associated with the plurality of respective business units;
determining a purchase function;
calculating a recommended waste credit purchase amount and the plurality of recommended waste credit reduction amounts associated with the plurality of respective business units, wherein the calculating further comprises minimizing a sum of the plurality of the revenue loss functions and the purchase function, subject to the waste credit constraints, a purchase constraint, and a reduction goal constraint and storing the recommended waste credit purchase amount in computer memory; and
presenting the recommended waste credit purchase amount and the plurality of recommended waste credit reduction amounts.

9. The storage medium of claim 8, wherein the determining the plurality of revenue loss functions further comprises:
creating the plurality of revenue loss functions by a least squares algorithm.

10. The storage medium of claim 9, wherein the determining the plurality of revenue loss functions further comprises:
creating the plurality of revenue loss functions by a basis spline algorithm.

11. The storage medium of claim 8, wherein the minimizing further comprises:
performing a quadratic programming algorithm on the sum of the plurality of the revenue loss functions and the purchase function, subject to the waste credit constraints, the purchase constraint, and the reduction goal constraint.

12. The storage medium of claim 8, further comprising:
purchasing an amount of waste credits specified by the recommended waste credit purchase amount.

13. The storage medium of claim 8, further comprising:
reducing waste emissions from the plurality of business units by the plurality of respective recommended waste credit reduction amounts.

14. A computer system comprising:
a processor; and
memory connected to the processor, wherein the memory encodes instructions that when executed by the processor comprise:

determining a plurality of revenue loss functions associated with a plurality of respective business units, wherein the plurality of revenue loss functions calculate an amount of revenue that each of the plurality of respective business units loses from reducing emissions by the plurality of business units and wherein the plurality of revenue loss functions are functions of a plurality of recommended waste credit reduction amounts, wherein the plurality of recommended waste credit reduction amounts are unknown at a time of the determining the plurality of revenue loss functions, and wherein the plurality of revenue loss functions are different for each of the plurality of respective business units, wherein the determining the plurality of revenue loss functions further comprises reading a plurality of historical data associated with the plurality of business units, wherein each of the plurality of historical data comprises historical waste credits saved and associated historical revenue losses that were caused by actions taken to save the historical waste credits and creating the plurality of revenue loss functions that describe a plurality of curves that fit the historical waste credits saved and the historical revenue losses, receiving a plurality of waste credit constraints associated with the plurality of respective business units, determining a purchase function, calculating a recommended waste credit purchase amount and the plurality of recommended waste credit reduction amounts associated with the plurality of respective business units, wherein the calculating further comprises minimizing a sum of the plurality of the revenue loss functions and the purchase function, subject to the waste credit constraints, a purchase constraint, and a reduction goal constraint, and purchasing an amount of waste credits specified by the recommended waste credit purchase amount.

15. The computer system of claim 14, wherein the determining the plurality of revenue loss functions further comprises:
creating the plurality of revenue loss functions by a least squares algorithm.

16. The computer system of claim 15, wherein the determining the plurality of revenue loss functions further comprises:
creating the plurality of revenue loss functions by a basis spline algorithm.

17. The computer system of claim 14, wherein the minimizing further comprises:
performing a quadratic programming algorithm on the sum of the plurality of the revenue loss functions and the purchase function, subject to the waste credit constraints, the purchase constraint, and the reduction goal constraint.

18. The computer system of claim 14, wherein the instructions further comprise:
reducing waste emissions from the plurality of business units by the plurality of respective recommended waste credit reduction amounts.

19. The computer system of claim 14, wherein the minimizing further comprises:
finding a combination of the plurality of recommended waste credit reduction amounts and the recommended waste credit purchase amount that cause the sum of plurality of the revenue loss functions and the purchase function to achieve a minimum, where the plurality of recommended waste credit reduction amounts meet the plurality of respective waste credit constraints, the recommended waste credit purchase amount meets the purchase constraint, and a sum of the plurality of recommended waste credit reduction amounts and the recommended waste credit purchase amount meets the reduction goal constraint.

\* \* \* \* \*